United States Patent
Yukawa et al.

(10) Patent No.: US 7,583,570 B2
(45) Date of Patent: Sep. 1, 2009

(54) OPTICAL PICKUP AND DISC DRIVE APPARATUS

(75) Inventors: Hiroaki Yukawa, Kanagawa (JP); Midori Kanaya, Tokyo (JP)

(73) Assignee: Sony Corporation, Tokyo (JP)

( * ) Notice: Subject to any disclaimer, the term of this patent is extended or adjusted under 35 U.S.C. 154(b) by 731 days.

(21) Appl. No.: 11/155,512

(22) Filed: Jun. 20, 2005

(65) Prior Publication Data

US 2006/0007811 A1    Jan. 12, 2006

(30) Foreign Application Priority Data

Jul. 6, 2004     (JP) ............................. 2004-199121

(51) Int. Cl.
*G11B 7/135* (2006.01)
(52) U.S. Cl. .................... 369/44.37; 369/112.07; 369/124.02
(58) Field of Classification Search .............. 369/44.37, 369/53.28, 53.23, 112.01, 112.03, 112.04, 369/112.07, 112.12, 109.01, 110.03, 112.11
See application file for complete search history.

(56) References Cited

U.S. PATENT DOCUMENTS

| 5,027,337 A | * | 6/1991 | Takahashi et al. | ........ 369/44.26 |
| 5,412,631 A | * | 5/1995 | Komma et al. | ............ 369/44.37 |
| 6,229,771 B1 | * | 5/2001 | Kosoburd et al. | ........ 369/44.23 |
| 6,400,664 B1 | * | 6/2002 | Shimano et al. | .......... 369/44.37 |
| 6,707,773 B2 | * | 3/2004 | Katayama | ................. 369/53.19 |
| 2002/0031062 A1 | * | 3/2002 | Izumi et al. | .............. 369/44.41 |
| 2002/0093893 A1 | * | 7/2002 | Matsuda | .................. 369/44.41 |
| 2002/0181353 A1 | * | 12/2002 | Katayama | ................. 369/44.37 |
| 2004/0246834 A1 | * | 12/2004 | Seong | ...................... 369/44.37 |

FOREIGN PATENT DOCUMENTS

JP     9-293263     11/1997

* cited by examiner

*Primary Examiner*—Wayne R Young
*Assistant Examiner*—Thomas D Alunkal
(74) *Attorney, Agent, or Firm*—Oblon, Spivak, McClelland, Maier & Neustadt, P.C.

(57) ABSTRACT

An optical pickup includes a diffracting element having a plurality of regions for dividing the laser light emitted from the light-emitting element into a main beam and pairs of first, second, third, and fourth sub-beams. When the first to fourth sub-beams form first to fourth sub-spots, respectively, in that order along a radial direction on a recording surface of an arbitrary kind of disc-shaped recording medium which does not have the largest track pitch, n is a natural number, and the track pitch is Pa, the distance $Da_{12}$ between the first and second sub-spots is approximately $(2n_{12}-1) \times Pa/2$, the distance $Da_{34}$ between the third and fourth sub-spots is approximately $(2n_{34}-1) \times Pa/2$, the distance $Da_{13}$ between the first and third sub-spots is approximately $(2n_{13}-1) \times Pa$, and the distance $Da_{24}$ between the second and fourth sub-spots is approximately $(2n_{24}-1) \times Pa$.

8 Claims, 13 Drawing Sheets

Da12, 23, 34 = Pa/2

— MAIN BEAM
------- SUB BEAM AFTER REDUCTION
—··— SUB BEAM BEFORE REDUCTION
■■■ DDP AFTER REDUCTION
—··— DDP BEFORE REDUCTION

OPTICAL PICKUP AND DISC DRIVE APPARATUS

CROSS REFERENCES TO RELATED APPLICATIONS

The present invention contains subject matter related to Japanese Patent Application JP 2004-199121 filed in the Japanese Patent Office on Jul. 6, 2004, the entire contents of which are incorporated herein by reference.

BACKGROUND OF THE INVENTION

1. Field of the Invention

The present invention relates to a technical field of an optical pickup and a disc drive apparatus. More specifically, the present invention relates to an improvement of the quality of a tracking error signal by reducing the influence of eccentricity of a disc-shaped recording medium and the like.

2. Description of the Related Art

Disc drive apparatuses for recording/reproducing information signals on disc-shaped recording media are known. A typical disc drive apparatus includes an optical pickup that moves in a radial direction of a disc-shaped recording medium mounted on a disc table and irradiates the disc-shaped recording medium with laser light through an objective lens to record or reproduce information signals.

The optical pickup performs focus adjustment by detecting a focusing error signal and moving the objective lens toward and away from a recording surface of the disc-shaped recording medium (in a focusing direction) depending on the result of detection. In addition, the optical pickup performs tracking adjustment by detecting a tracking error signal and moving the objective lens in a substantially radial direction of the disc-shaped recording medium (in a tracking direction) depending on the result of detection.

A push-pull method is known as a method for detecting the tracking error signal. However, this method has a problem in that a large current-variation (DC offset) signal is easily generated when the objective lens moves in the tracking direction.

Therefore, a differential push-pull method, which can reduce the DC offset signal, is commonly used for detecting the tracking error signal (refer to, for example, Japanese Unexamined Patent Application Publication No. 61-94246).

In the differential push-pull method, laser light is divided into a main beam and a pair of sub-beams using a diffracting element. As shown in FIG. 13, spots of sub beams (sub-spots S) formed on the recording surface of the disc-shaped recording medium are positioned between the adjacent tracks T, so that distances from a spot of the main beam (main spot M) to the subs spots S are both one-half of a track pitch P.

In the differential push-pull method, the distances from the main spot M to the sub-spots S are both one-half of the track pitch. Accordingly, the phase of the tracking error signal detected by the main beam is inverted with respect to the phases of the tracking error signals detected by the sub beams, and the DC offset signal is canceled (see FIG. 14).

SUMMARY OF THE INVENTION

However, when the above-described differential push-pull method is used, if the diffracting element has an angular shift (shift in the rotational direction) due to eccentricity of the disc-shaped recording medium or change in the environment, such as temperature, the sub-spots S are displaced from the positions between the adjacent tracks T. Because of this displacement, the phases of the tracking error signals detected by the two sub-beams are shifted from each other, and the amplitude of the total tracking error signal detected by the sub-beams is reduced, as shown in FIG. 15. As a result, the amplitude of the differential push-pull (DPP) signal is also reduced.

In particular, when the disc-shaped recording medium is eccentric, the amplitude of the DPP signal varies while the disc-shaped recording medium rotates one turn, which degrades the quality of tracking servo control.

On the other hand, some disc drive apparatuses can record or reproduce information signals on multiple kinds of disc-shaped recording media, for example, on both Compact Discs (CD) and Digital Versatile Discs (DVD), which use different wavelengths.

In such a disc drive apparatus, it is difficult to position the sub-spots between the adjacent tracks for each kind of disc-shaped recording medium. This is not only because the track pitch differs depending on the kind of the disc-shaped recording medium, but also because the diffracting angle of the sub beams differs depending on the wavelength when the diffracting element is used in common for multiple wavelengths.

In this case, if, for example, the sub-spots are set to be positioned between the adjacent tracks for only one kind of disc-shaped recording medium, variation in the amplitude of the DPP signal and the DC offset signal are increased when the information signals are recorded on or reproduced from other kind of disc-shaped recording media. Although the sub-spots may also be positioned at midpoints of optimum positions for each kind of disc-shaped recording medium, the amplitude of the DPP signal varies and the DC offset signal is generated for all kind of disc-shaped recording media when the information signals are recorded or reproduced in this case. Accordingly, the quality of tracking servo control is degraded.

The above-described problems may be solved by using a dedicated diffracting element for each kind of disc-shaped recording medium. However, in this case, a plurality of diffracting elements are prepared, which leads to another problem in that the number of components and costs are increased. In addition, disc-shaped recording media using the same wavelength (e.g., DVD Read Only Memory (DVD-ROM), DVD Recordable (DVD±R), DVD Rewritable (DVD-RW), and DVD Random Access Memory (DVD-ROM) in the case of DVD) have different track pitches. Therefore, if a dedicated diffracting element is provided for each kind of DVD, the number of components and costs are considerably increased.

Accordingly, in disc drive apparatuses which record or reproduce information signals on disc-shaped recording media using different wavelengths or having different track pitches, there is a demand to ensure the quality of tracking servo control irrespective of the kind of disc-shaped recording medium on or from which the information signals are recorded or reproduced.

Therefore, it is desirable to reduce the influence of eccentricity of the disc-shaped recording medium and the like and improve the quality of the tracking error signal.

An optical pickup and a disc drive apparatus according to a first embodiment of the present invention includes a diffracting element having a plurality of regions for dividing the laser light emitted from the light-emitting element into a main beam, a pair of first sub-beams, a pair of second sub-beams, a pair of third sub-beams, and a pair of fourth sub-beams. When the first, second, third, and fourth sub-beams form first, second, third, and fourth sub-spots, respectively, on a recording surface of an arbitrary kind of disc-shaped recording medium which does not have the largest track pitch among said plurality of kinds of disc-shaped recording media, said first, second, third, and fourth sub-spots being arranged in that order along a radial direction of said arbitrary kind of disc-shaped recording medium, and when a distance from the centers of the first sub-spots to the centers of the second sub-spots is $Da_{12}$, a distance from the centers of the third sub-spots to the centers of the fourth sub-spots is $Da_{34}$, a distance from the centers of the first sub-spots to the centers of the third sub-spots is $Da_{13}$, a distance from the centers of the second sub-spots to the centers of the fourth sub-spots is $Da_{24}$, $n_{12}$, $n_{34}$, $n_{13}$, and $n_{24}$ are natural numbers, and the track pitch of said arbitrary kind of disc-shaped recording medium is Pa, the distance $Da_{12}$ is approximately $(2n_{12}-1)\times Pa/2$, the distance $Da_{34}$ is approximately $(2n_{34}-1)\times Pa/2$, the distance $Da_{13}$ is approximately $(2n_{13}-1)\times Pa$, and the distance $Da_{24}$ is approximately $(2n_{24}-1)\times Pa$.

An optical pickup and a disc drive apparatus according to a second embodiment of the present invention also includes a diffracting element having a plurality of regions for dividing the laser light emitted from the light-emitting element into a main beam, a pair of first sub-beams, a pair of second sub-beams, a pair of third sub-beams, and a pair of fourth sub-beams. When the first, second, third, and fourth sub-beams form first, second, third, and fourth sub-spots, respectively, on a recording surface of an arbitrary kind of disc-shaped recording medium which does not have the smallest track pitch among said plurality of kinds of disc-shaped recording media, said first, second, third, and fourth sub-spots being arranged in that order along a radial direction of said arbitrary kind of disc-shaped recording medium, and when a distance from the centers of the first sub-spots to the centers of the second sub-spots is $Db_{12}$, a distance from the centers of the third sub-spots to the centers of the fourth sub-spots is $Db_{34}$, a distance from the centers of the first sub-spots to the centers of the third sub-spots is $Db_{13}$, a distance from the centers of the second sub-spots to the centers of the fourth sub-spots is $Db_{24}$, $n_{12}$, $n_{34}$, $n_{13}$, and $n_{24}$ are natural numbers, and the track pitch of said arbitrary kind of disc-shaped recording medium is Pb, the distance $Db_{13}$ is approximately $(2n_{13}-1)\times Pb/2$, the distance $Db_{24}$ is approximately $(2n_{24}-1)\times Pb/2$, the distance $Db_{12}$ is approximately $(2n_{12}-1)\times Pb/4$, and the distance $Db_{34}$ is approximately $(2n_{34}-1)\times Pb/4$.

Therefore, in the optical pickup and the disc drive apparatus according to the embodiments of the present invention, phases of tracking error signals detected by the first, second, third, and fourth sub-beams are inverted, and the tracking error signals cancel each other in total.

The optical pickup and the disc drive apparatus according to the first embodiment of the present invention is capable of recording or reproducing information signals on a plurality of kinds of disc-shaped recording media. The optical pickup moves in a radial direction of a disc-shaped recording medium mounted on a disc table while irradiating the disc-shaped recording medium with laser light emitted from a light-emitting element and having a wavelength corresponding to the kind of the disc-shaped recording medium. The optical pickup includes a diffracting element having a plurality of regions for dividing the laser light emitted from the light-emitting element into a main beam, a pair of first sub-beams, a pair of second sub-beams, a pair of third sub-beams, and a pair of fourth sub-beams. When the first, second, third, and fourth sub-beams form first, second, third, and fourth sub-spots, respectively, on a recording surface of an arbitrary kind of disc-shaped recording medium which does not have the largest track pitch among said plurality of kinds of disc-shaped recording media, said first, second, third, and fourth sub-spots being arranged in that order along a radial direction of said arbitrary kind of disc-shaped recording medium, and when a distance from the centers of the first sub-spots to the centers of the second sub-spots is $Da_{12}$, a distance from the centers of the third sub-spots to the centers of the fourth sub-spots is $Da_{34}$, a distance from the centers of the first sub-spots to the centers of the third sub-spots is $Da_{13}$, a distance from the centers of the second sub-spots to the centers of the fourth sub-spots is $Da_{24}$, $n_{12}$, $n_{34}$, $n_{13}$, and $n_{24}$ are natural numbers, and the track pitch of said arbitrary kind of disc-shaped recording medium is Pa, the distance $Da_{12}$ is approximately $(2n_{12}-1)\times Pa/2$, the distance $Da_{34}$ is approximately $(2n_{34}-1)\times Pa/2$, the distance $Da_{13}$ is approximately $(2n_{13}-1)\times Pa$, and the distance $Da_{24}$ is approximately $(2n_{24}-1)\times Pa$.

Accordingly, when information signals are recorded on or reproduced from the disc-shaped recording medium, the optical pickup provides a reliable tracking error signal which corresponds to the disc-shaped recording medium and in which the influence of the eccentricity of the disc-shaped recording medium and the rotational displacement of the diffracting element is eliminated or reduced without performing phase adjustment of the diffracting element.

In addition, when the information signals are recorded on or reproduced from a plurality of kinds of disc-shaped recording media, the diffracting element can be used in common. Therefore, the quality of the tracking error signal can be increased without increasing the number of components and costs.

When the regions of the diffracting element are arranged along a tangential direction of the disc-shaped recording medium, the positional relationship between the laser light incident on the diffracting element and the regions of the diffracting element does not vary. Therefore, generation of the sub-beams by the diffracting element is prevented from being influenced in the tracking control operation.

In addition, in the tracking control operation, the relationship between the main beam and the laser light before diffraction does not vary, and the modulation is prevented from being influenced.

The optical pickup and the disc drive apparatus according to the second embodiment of the present invention is capable of recording or reproducing information signals on a plurality of kinds of disc-shaped recording media. The optical pickup moves in a radial direction of a disc-shaped recording medium mounted on a disc table while irradiating the disc-shaped recording medium with laser light emitted from a light-emitting element and having a wavelength corresponding to the kind of the disc-shaped recording medium. The optical pickup includes a diffracting element having a plurality of regions for dividing the laser light emitted from the light-emitting element into a main beam, a pair of first sub-beams, a pair of second sub-beams, a pair of third sub-beams, and a pair of fourth sub-beams. When the first, second, third, and fourth sub-beams form first, second, third, and fourth sub-spots, respectively, on a recording surface of an arbitrary kind of disc-shaped recording medium which does not have the smallest track pitch among said plurality of kinds of disc-shaped recording media, said first, second, third, and fourth sub-spots being arranged in that order along a radial direction of said arbitrary kind of disc-shaped recording medium, and when a distance from the centers of the first sub-spots to the centers of the second sub-spots is $Db_{12}$, a distance from the centers of the third sub-spots to the centers of the fourth sub-spots is $Db_{34}$, a distance from the centers of the first sub-spots to the centers of the third sub-spots is $Db_{13}$, a distance from the centers of the second sub-spots to the centers of the fourth sub-spots is $Db_{24}$, $n_{12}$, $n_{34}$, $n_{13}$, and $n_{24}$ are natural numbers, and the track pitch of said arbitrary kind of disc-shaped recording medium is Pb, the distance $Db_{13}$ is approximately $(2n_{13}-1) \times Pb/2$, the distance $Db_{24}$ is approximately $(2n_{24}-1) \times Pb/2$, the distance $Db_{12}$ is approximately $(2n_{24}-1) \times Pb/4$, and the distance $Db_{34}$ is approximately $(2n_{34}-1) \times Pb/4$.

Accordingly, when information signals are recorded on or reproduced from the disc-shaped recording medium, the optical pickup provides a reliable tracking error signal which corresponds to the disc-shaped recording medium and in which the influence of the eccentricity of the disc-shaped recording medium and the rotational displacement of the diffracting element is eliminated or reduced without performing phase adjustment of the diffracting element.

In addition, when the information signals are recorded on or reproduced from a plurality of kinds of disc-shaped recording media, the diffracting element can be used in common. Therefore, the quality of the tracking error signal can be increased without increasing the number of components and costs.

When the regions of the diffracting element are arranged along a tangential direction of the disc-shaped recording medium, the positional relationship between the laser light incident on the diffracting element and the regions of the diffracting element does not vary. Therefore, generation of the sub-beams by the diffracting element is prevented from being influenced in the tracking control operation.

In addition, in the tracking control operation, the relationship between the main beam and the laser light before diffraction does not vary, and the modulation is prevented from being influenced.

DESCRIPTION OF THE PREFERRED EMBODIMENT

An optical pickup and a disc drive apparatus according to an embodiment of the present invention will be described below with reference to the accompanying drawings.

Figure 1:
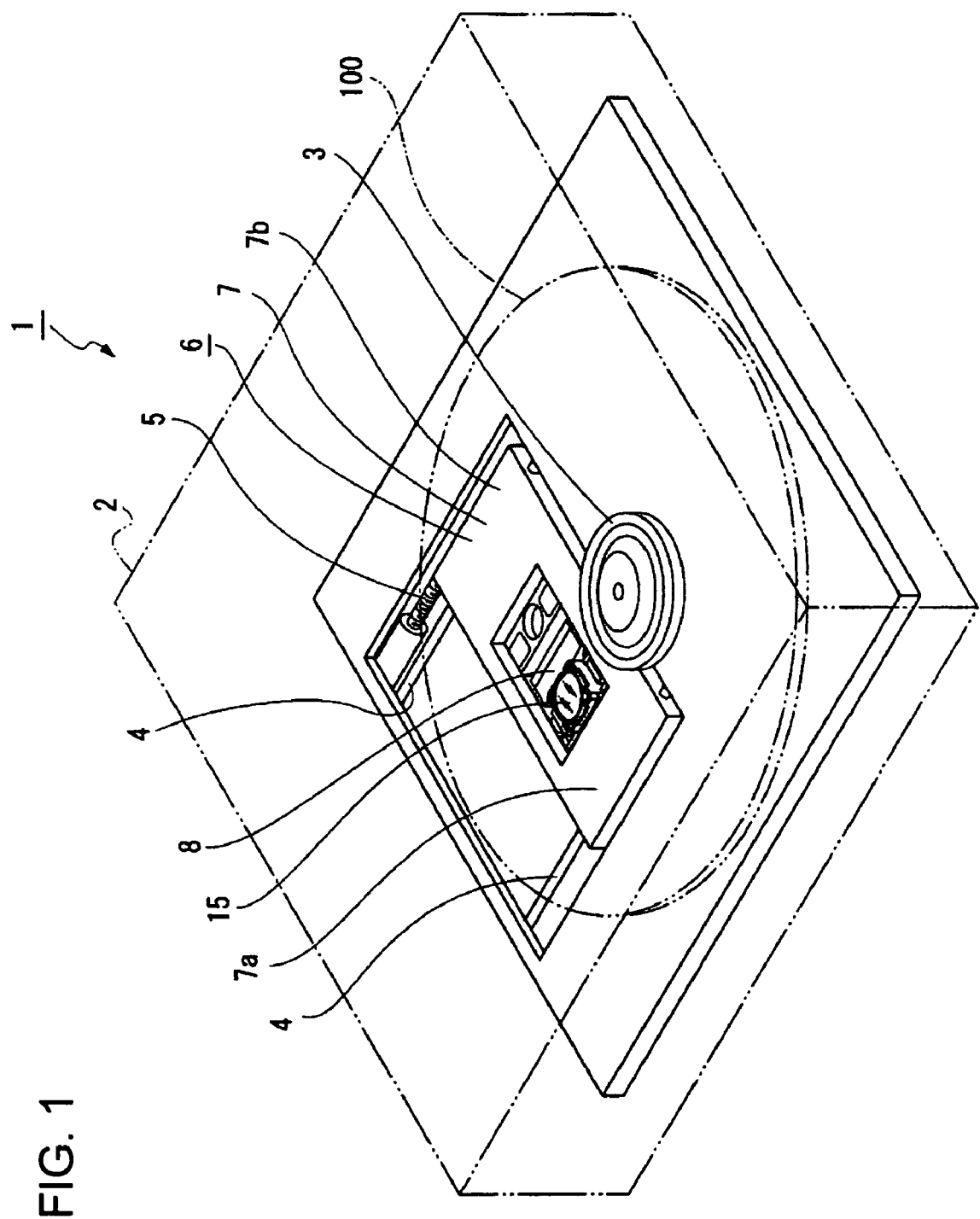
FIG. 1 is a schematic perspective view of a disc drive apparatus according to an embodiment of the present invention.

A disc drive apparatus 1 includes an outer housing 2 in which components and mechanisms are arranged (see FIG. 1), and the outer housing 2 has a disc insertion slot (not shown).

A chassis (not shown) is disposed in the outer housing 2, and a disc table 3 is fixed to a motor shaft of a spindle motor attached to the chassis.

Guide shafts 4 and 4 are attached to the chassis in such a manner that they are parallel to each other, and a lead screw 5 rotated by a motor (not shown) is supported by the chassis.

An optical pickup 6 includes a moving base 7, optical components provided on the moving base 7, and an objective-lens driver 8 disposed on the moving base 7. Bearings 7a and 7b provided at the ends of the moving base 7 are slidably supported by the guide shafts 4 and 4. A nut (not shown) provided on the moving base 7 is engaged with the lead screw 5. When the lead screw 5 is rotated by the motor, the nut is moved in a direction corresponding to the rotational direction of the lead screw 5. Accordingly, the optical pickup 6 is moved in the radial direction of a disc-shaped recording medium 100 mounted on the disc table 3.

The disc-shaped recording medium 100 is, for example, a DVD 100a or a CD 100b.

In the disc drive apparatus 1 having the above structure, when the disc table 3 is rotated in association with the rotation of a spindle motor, the disc-shaped recording medium 100, that is, the DVD 100a or the CD 100b mounted on the disc table 3 is also rotated. At the same time, the optical pickup 6 is moved in the radial direction of the disc-shaped recording medium 100, and performs a process of recording or reproducing information signals on the disc-shaped recording medium 100.

Figure 2:
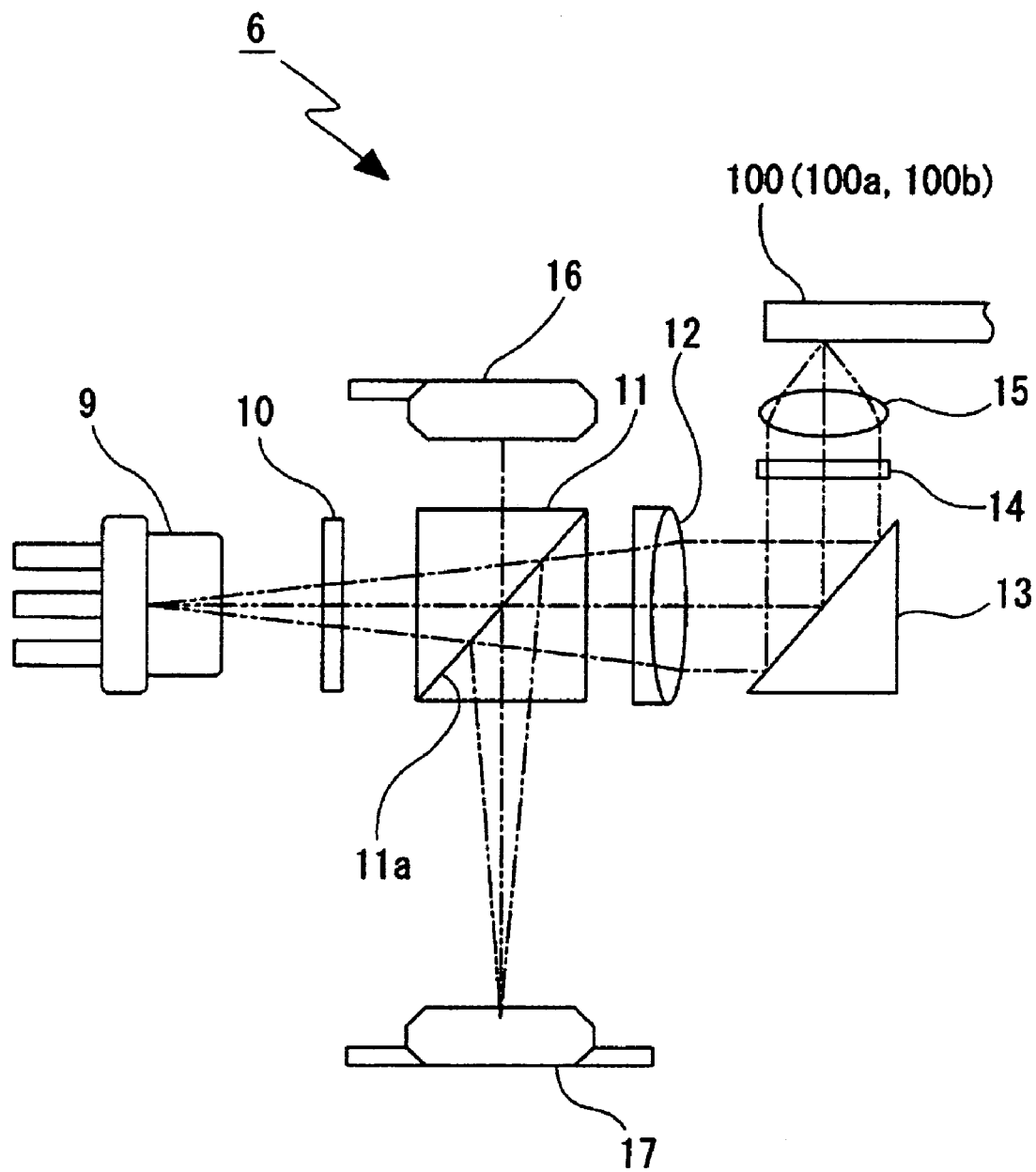
FIG. 2 is a schematic diagram showing the structure of an optical pickup.

As shown in FIG. 2, the optical pickup 6 includes a light-emitting element 9, a diffracting element 10, a beam splitter 11, a collimating lens 12, a mirror 13, a quarter-wave plate 14, an objective lens 15, a monitor photodetector 16, and a photodetector 17. The light-emitting element 9, the diffracting element 10, the beam splitter 11, the collimating lens 12, the mirror 13, the quarter-wave plate 14, the monitor photodetector 16, and the photodetector 17 are arranged on the moving base 7, and the objective lens 15 is provided on the objective-lens driver 8.

The light-emitting element 9 has first and second light-emitting points for emitting laser light with different wavelengths. The first light-emitting point emits laser light with a wavelength of, for example, about 650 nm (first wavelength), and the second light-emitting point emits laser light with a wavelength of, for example, about 780 nm (second wavelength). When information signals are recorded on or reproduced from the DVD 100a, which is one kind of disc-shaped recording medium 100, the first light-emitting point emits the laser light with a wavelength of about 650 nm. When information signals are recorded on or reproduced from the CD 100b, which is another kind of disc-shaped recording medium 100, the second light-emitting point emits the laser light with a wavelength of about 780 nm.

Figure 3:
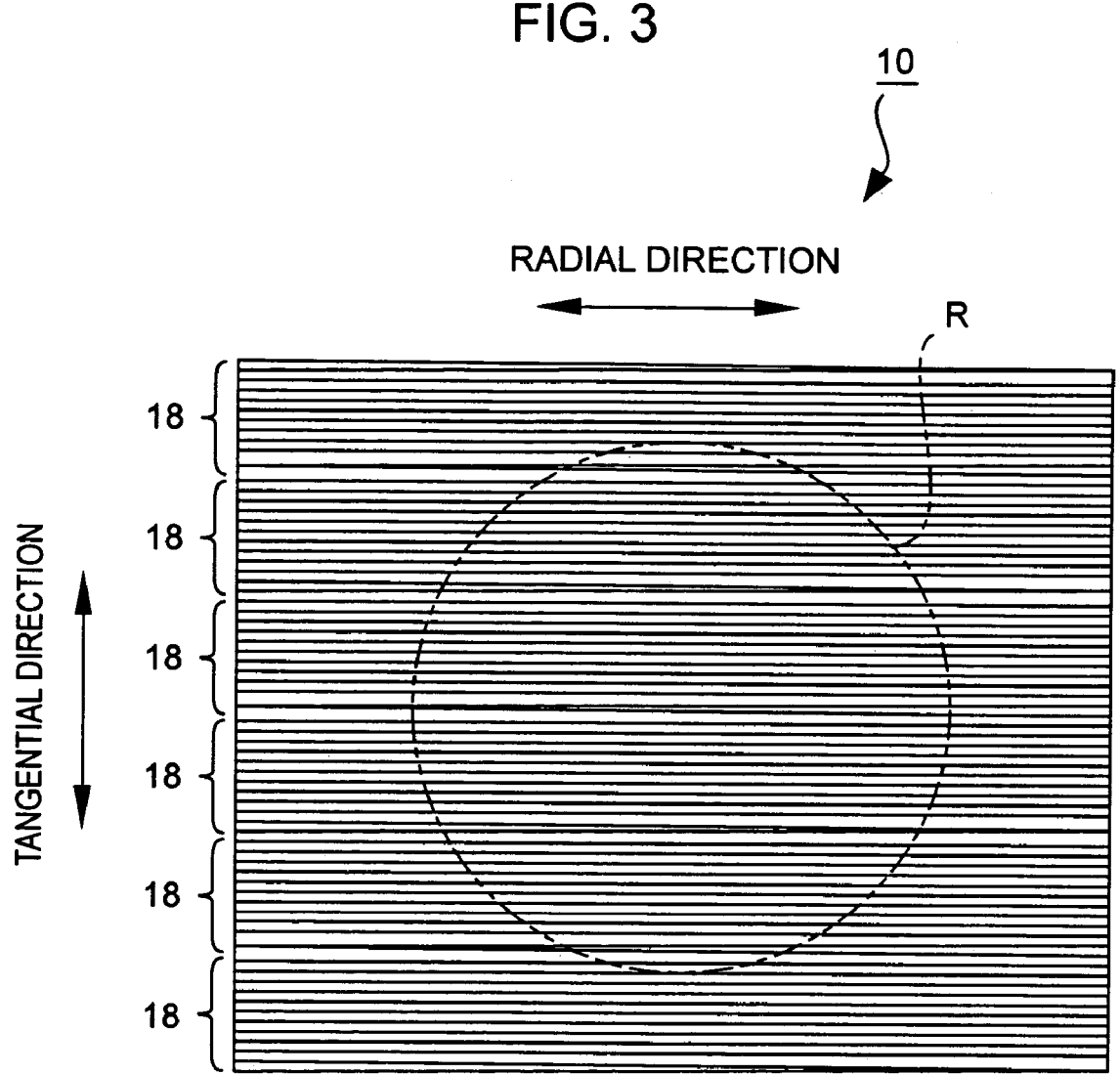
FIG. 3 is a schematic diagram showing a diffracting element.

The diffracting element 10 is, for example, a grating, and is divided into a plurality of regions 18 (see FIG. 3). Laser light R emitted from the light-emitting element 9 enters a plurality of regions 18 of the diffracting element 10, and is divided into a main beam (0-order light), a pair of first sub-beams (±1-order light), a pair of second sub-beams (±2-order light), a pair of third sub-beams (±3-order light), and a pair of fourth sub-beams (±4-order light).

The beam splitter 11 is, for example, a transmissive beam splitter, and has a function of transmitting a part of the laser light from the light-emitting element 9 toward the collimating lens 12 and reflecting the laser light returning from the disc-shaped recording medium 100 toward the photodetector 17 with a separation surface 11a. The beam splitter 11 reflects another part of the laser light from the light-emitting element 9 toward the monitor photodetector 16 with the separation surface 11a.

The collimating lens 12 has a function of collimating the laser light incident thereon, and the mirror 13 has a function of reflecting the laser light toward the quarter-wave plate 14 or the collimating lens 12. The quarter-wave plate 14 has a function of converting the polarizing direction of the laser light incident thereon, and the objective lens 15 has a function of focusing the laser light incident thereon onto a recording surface of the disc-shaped recording medium 100.

The monitor photodetector 16 has a function of detecting the intensity of the laser light emitted from the light-emitting element 9. The detection result obtained by the monitor photodetector 16 is fed back to a drive circuit for driving the light-emitting element 9, and the light-emitting element 9 is controlled on the basis of the detection result obtained by the monitor photodetector 16 so that laser light with a substantially constant intensity is emitted from the light-emitting element 9.

In the optical pickup 6 structured as above, when the laser light with the first wavelength (about 650 nm) corresponding to the DVD 100a is emitted from the first light-emitting point of the light-emitting element 9, the laser light is diffracted by the diffracting element 10 and is divided into the main beam, the pair of first sub-beams, the pair of second sub-beams, the pair of third sub-beams, and the pair of fourth sub-beams.

The diffracted laser light passes through the beam splitter 11 and is collimated by the collimating lens 12. The collimated laser light is reflected upward by the mirror 13 and reaches the quarter-wave plate 14, where the polarizing direction of the laser light is converted. Then, the laser light is directed onto the recording surface of the DVD 100a mounted on the disc table 3 through the objective lens 15. The laser light directed onto the recording surface of the DVD 100a is reflected by the recording surface and returns to the beam splitter 11 via the objective lens 15, the quarter-wave plate 14, the mirror 13, and the collimating lens 12. The laser light returned to the beam splitter 11 is reflected by the separation surface 11a of the beam splitter 11 and enters the photodetector 17. At this time, a part of light emitted from the light-emitting element 9 is reflected by the separation surface 11a in the beam splitter 11 and received by the monitor photodetector 16, and the intensity of the laser light emitted from the first light-emitting point of the light-emitting element 9 is controlled to be constant.

In the optical pickup 6, when sub-spots of the first sub-beams of the laser light with the first wavelength are $S_{1a}$ and $S_{1b}$, sub-spots of the second sub-beams are $S_{2a}$ and $S_{2b}$, sub-spots of the third sub-beams are $S_{3a}$ and $S_{3b}$, sub-spots of the fourth sub-beams are $S_{4a}$ and $S_{4b}$, the sub-spots $S_{1a}$, $S_{2a}$, $S_{3a}$, and $S_{4a}$ and the sub-spots $S_{1b}$, $S_{2b}$, $S_{3b}$, and $S_{4b}$ being formed in that order in a substantially radial direction of the DVD 100a, the track pitch of the DVD 100a is Pa, $n_{12}$, $n_{34}$, $n_{13}$, and $n_{24}$ are natural numbers, a distance from the centers of the sub-spots $S_{1a}$ and $S_{1b}$ to the centers of the sub-spots $S_{2a}$ and $S_{2b}$ is $Da_{12}$, a distance from the sub-spots $S_{3a}$ and $S_{3b}$ to the centers of the sub-spots $S_{4a}$ and $S_{4b}$ is $Da_{34}$, a distance from the sub-spots $S_{1a}$ and $S_{1b}$ to the centers of the sub-spots $S_{3a}$ and $S_{3b}$ is $Da_{13}$, and a distance from the sub-spots $S_{2a}$ and $S_{2b}$ to the centers of the sub-spots $S_{4a}$ and $S_{4b}$ is $Da_{24}$, the diffracting element 10 is designed such that the distance $Da_{12}$ is approximately $(2n_{12}-1) \times Pa/2$, the distance $Da_{34}$ is approximately $(2n_{34}-1) \times Pa/2$, the distance $Da_{13}$ is approximately $(2n_{13}-1) \times Pa$, and the distance $Da_{24}$ is approximately $(2n_{24}-1) \times Pa$.

Figure 4:
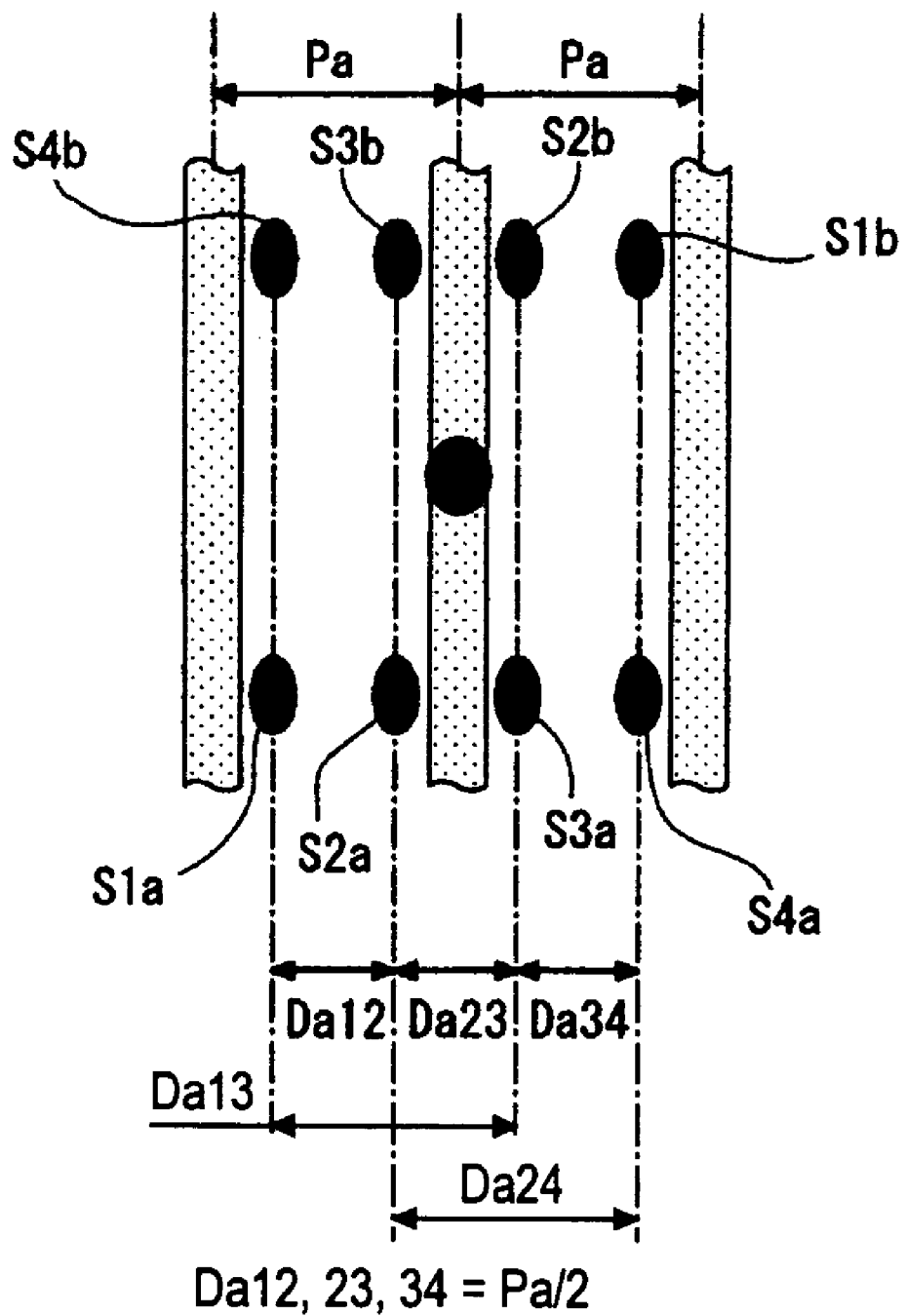
FIG. 4 is a schematic diagram showing the positional relationship between spots of laser light corresponding to DVD and tracks when distances between sub-spots of the laser light corresponding to DVD are set to one-half of a track pitch.

When, for example, $n_{12}$, $n_{34}$, $n_{13}$, and $n_{24}$ are all 1, $Da_{12}$ and $Da_{34}$ are approximately Pa/2, and $Da_{13}$ and $Da_{24}$ are approximately Pa. Accordingly, distances Da between the adjacent spots ($Da_{12}$, $Da_{23}$, and $Da_{34}$) are all approximately Pa/2 (see FIG. 4).

Therefore, when the DVD 100a is a DVD-ROM, a DVD±R, or a DVD-RW, the standard track pitch Pa is 0.74 μm. Therefore, when $n_{12}$, $n_{34}$, $n_{13}$, and $n_{24}$ are all 1, the distances $Da_{12}$, $Da_{23}$, and $Da_{34}$ are all about 0.37 μm.

When the DVD 100a is a DVD-RAM, the standard track pitch Pa is 1.23 μm. Therefore, when $n_{12}$, $n_{34}$, $n_{13}$, and $n_{24}$ are all 1, the distances $Da_{12}$, $Da_{23}$, and $Da_{34}$ are all about 0.62 μm.

Figure 5:
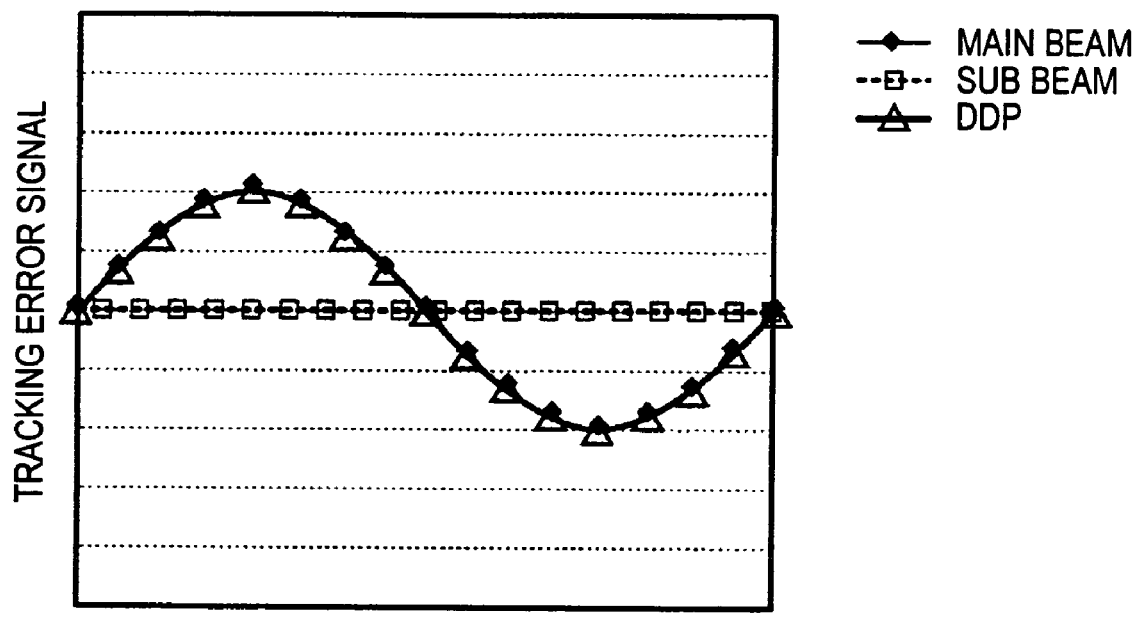
FIG. 5 is a graph showing a tracking error signal.

When the returning light enters the photodetector 17, a tracking error signal is detected on the basis of the main beam and the sub-beams received by the photodetector 17. As described above, the distances $Da_{12}$ and $Da_{34}$ between the sub-spots are about one-half of the track pitch Pa. Therefore, phases of tracking error signals detected by sub-spots $S_{1a}$ and $S_{2a}$, phases of tracking error signals detected by sub-spots $S_{3a}$ and $S_{4a}$, phases of tracking error signals detected by sub-spots $S_{1b}$ and $S_{2b}$, and phases of tracking error signals detected by sub-spots $S_{3b}$ and $S_{4b}$ are inverted from each other. Accordingly, the amplitude of the total tracking error signal obtained by the sub-beams is 0, as shown in FIG. 5, and only a DC offset signal generated when the objective lens 15 is displaced in the tracking direction is obtained. Although both a tracking error signal and a DC offset signal are detected by the main beam, an adequate tracking error signal can be obtained by cancelling the DC offset signal detected by the main beam with the DC offset signal detected by the sub-beams.

When the distances Da ($Da_{12}$, $Da_{23}$, and $Da_{34}$) between the centers of the adjacent spots are all approximately Pa/2 as described above, the total tracking error signal obtained by the sub-beams is calculated as 0 by Equation (1) below:

$$\mathrm{Cos}(\alpha+3\pi/2)+\mathrm{Cos}(\alpha+\pi/2)+\mathrm{Cos}(\alpha-\pi/2)+\mathrm{Cos}(\alpha-3\pi/2) = 0 \quad (1)$$

The distances $Da_{12}$, $Da_{34}$, $Da_{13}$, and $Da_{24}$ between the sub-spots of the sub-beams are exclusively determined from the design of the diffracting element 10. Therefore, even when the phase of the tracking error signal detected by the main beam and the phases of the tracking error signals detected by the sub-beams vary due to the eccentricity of the DVD 100a, the amplitude of the DPP signal is prevented from being reduced due to the eccentricity of the DVD 100a since the tracking error signals of the sub-beams cancel each other in total.

When the laser light with the second wavelength (about 780 nm) corresponding to the CD 100b is emitted from the second light-emitting point of the light-emitting element 9, the laser light is diffracted by the diffracting element 10 and is divided into the main beam, the pair of first sub-beams, the pair of second sub-beams, the pair of third sub-beams, and the pair of fourth sub-beams.

The diffracted laser light passes through the beam splitter 11 and is collimated by the collimating lens 12. The collimated laser light is reflected upward by the mirror 13 and reaches the quarter-wave plate 14, where the polarizing direction of the laser light is converted. Then, the laser light is directed onto the recording surface of the CD 100b mounted on the disc table 3 through the objective lens 15. The laser light directed onto the recording surface of the CD 100b is reflected by the recording surface and returns to the beam splitter 11 via the objective lens 15, the quarter-wave plate 14, the mirror 13, and the collimating lens 12. The laser light returned to the beam splitter 11 is reflected by the separation surface 11a of the beam splitter 11 and enters the photodetector 17. At this time, a part of light emitted from the light-emitting element 9 is reflected by the separation surface 11a in the beam splitter 11 and received by the monitor photodetector 16, and the intensity of the laser light emitted from the second light-emitting point of the light-emitting element 9 is controlled to be constant.

In the optical pickup 6, the diffracting element 10 is designed such that the distance $Da_{12}$ is approximately $(2n_{12}-1) \times Pa/2$, the distance $Da_{34}$ is approximately $(2n_{34}-1) \times Pa/2$, the distance $Da_{13}$ is approximately $(2n_{13}-1) \times Pa$, and the distance $Da_{24}$ is approximately $(2n_{24}-1) \times Pa$, when the DVD 100a is used. Since the diffracting angle of the diffracting element 10 is proportional to the wavelength, when the distance between the centers of the sub-spots formed by the laser light with the first wavelength is Da and the distance between the centers of the sub-spots formed by the laser light with the second wavelength is Db, the distance Db is calculated as $Db=(780/650) \times Da$.

When the DVD 100a is a DVD-ROM, a DVD±R, or a DVD-RW and n ($n_{12}$, $n_{34}$, $n_{13}$, and $n_{24}$)=1 is satisfied, Da is 0.37 μm as described above. Accordingly, Db is calculated as 0.44 μm.

In addition, when the DVD 100a is a DVD-RAM and n=1 is satisfied, Da is 0.62 μm. Accordingly, Db is calculated as 0.73 μm.

Figure 6:
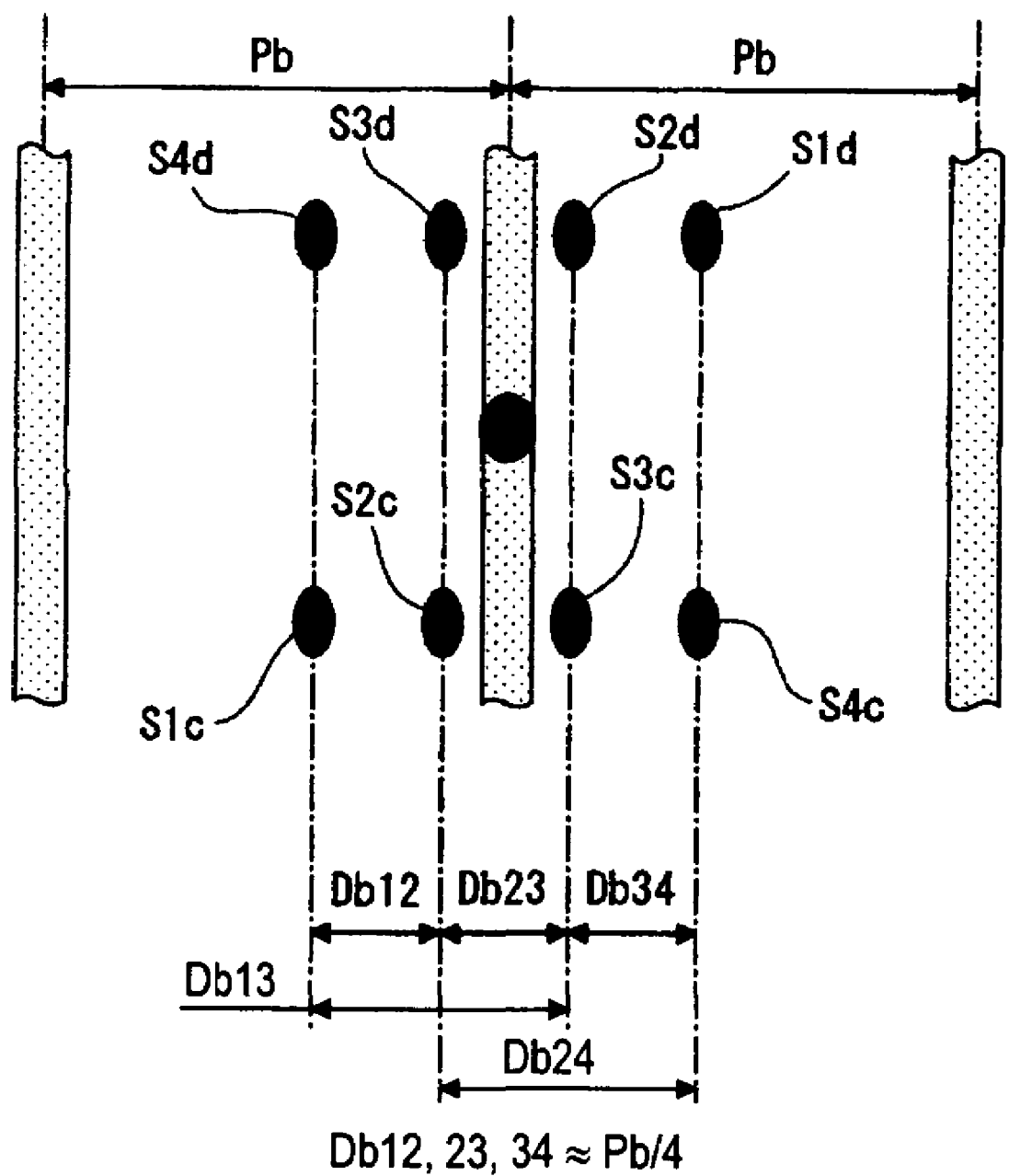
FIG. 6 is a schematic diagram showing the positional relationship between spots of laser light corresponding to CD and tracks when the distances between the sub-spots of the laser light corresponding to DVD are set to one-half of the track pitch.

The standard track pitch Pb of the CD 100b is 1.6 μm. Therefore, when the DVD 100a is a DVD-ROM, a DVD±R, or a DVD-RW, the distance Db is 0.44 μm, as described above, and is about a quarter of the track pitch Pb (see FIG. 6).

When the returning light enters the photodetector 17, a tracking error signal is detected on the basis of the main beam and the sub-beams received by the photodetector 17. As described above, the distances $Db_{12}$, $Db_{23}$, and $Db_{34}$ between the sub-spots are about a quarter of the track pitch Pb, and the distances $Db_{13}$ and $Db_{24}$ are about one-half of the track pitch Pb. Therefore, phases of tracking error signals detected by sub-spots $S_{1c}$ and $S_{3c}$, phases of tracking error signals detected by sub-spots $S_{2c}$ and $S_{4c}$, phases of tracking error signals detected by sub-spots $S_{1d}$ and $S_{3d}$, and phases of tracking error signals detected by sub-spots $S_{2d}$ and $S_{4d}$ are inverted from each other. Accordingly, the amplitude of the total tracking error signal obtained by the sub-beams is close to 0. Although both a tracking error signal and a DC offset signal are detected by the main beam, an adequate tracking error signal can be obtained by cancelling the DC offset signal detected by the main beam with the DC offset signal detected by the sub-beams.

When the distances Db ($Db_{12}$, $Db_{23}$, and $Db_{34}$) between the centers of the adjacent spots are all approximately Pb/4 as described above, the total tracking error signal obtained by the sub-beams is calculated as 0 by Equation (2) below:

$$\cos(\alpha+3\pi/4)+\cos(\alpha+\pi/4)+\cos(\alpha-\pi/4)+\cos(\alpha-3\pi/4) = 0 \quad (2)$$

The distances Db between the sub-spots of the sub-beams are exclusively determined from the design of the diffracting element 10. Therefore, even when the phase of the tracking error signal detected by the main beam and the phases of the tracking error signals detected by the sub-beams vary due to the eccentricity of the CD 100b, the amplitude of the DPP signal is prevented from being reduced due to the eccentricity of the CD 100b since the tracking error signals of the sub-beams cancel each other in total.

When the DVD 100a is a DVD-RAM, the distance Db is 0.73 μm, as described above, and is about one-half of the standard track pitch Pb of the CD 100b, which is 1.6 μm.

When the returning light enters the photodetector 17, a tracking error signal is detected on the basis of the main beam and the sub-beams received by the photodetector 17. As described above, the distances $Db_{12}$ and $Db_{34}$ between the sub-spots are about one-half of the track pitch Pb. Therefore, phases of tracking error signals detected by sub-spots $S_{1c}$ and $S_{2c}$, phases of tracking error signals detected by sub-spots $S_{3c}$ and $S_{4c}$, phases of tracking error signals detected by sub-spots $S_{1d}$ and $S_{2d}$, and phases of tracking error signals detected by sub-spots $S_{3d}$ and $S_{4d}$ are inverted from each other. Accordingly, the amplitude of the total tracking error signal obtained by the sub-beams is close to 0. Although both a tracking error signal and a DC offset signal are detected by the main beam, an adequate tracking error signal can be obtained by cancelling the DC offset signal detected by the main beam with the DC offset signal detected by the sub-beams.

The distances Db between the sub-spots of the sub-beams are exclusively determined from the design of the diffracting element 10. Therefore, even when the phase of the tracking error signal detected by the main beam and the phases of the tracking error signals detected by the sub-beams vary due to the eccentricity of the CD 100b, the amplitude of the DPP signal is prevented from being reduced due to the eccentricity of the CD 100b since the tracking error signals of the sub-beams cancel each other in total.

The case in which the diffracting element 10 is designed such that the distances Da are set to a predetermined distance when recording or reproducing information signals on the DVD 100a is discussed above. However, in reverse, the diffracting element 10 may also be designed such that the distances Db are set to a predetermined distance when recording or reproducing information signals on the CD 100b, as described below.

When the track pitch of the CD 100b is Pb, the sub-spots $S_{1c}$, $S_{2c}$, $S_{3c}$, and $S_{4c}$ and the sub-spots $S_{1d}$, $S_{2d}$, $S_{3d}$, and $S_{4d}$ are formed in that order in the radial direction of the CD 100b, and the distance between the centers of the sub-spots is Db, the diffracting element 10 is designed such that the distance $Db_{13}$ is approximately $(2n_{13}-1) \times Pb/2$, the distance $Db_{24}$ is approximately $(2n_{24}-1)\times Pb/2$, the distance $Db_{12}$ is approximately $(2n_{12}-1)\times Pa/4$, and the distance $Db_{34}$ is approximately $(2n_{34}-1)\times Pa/4$.

Figure 7:
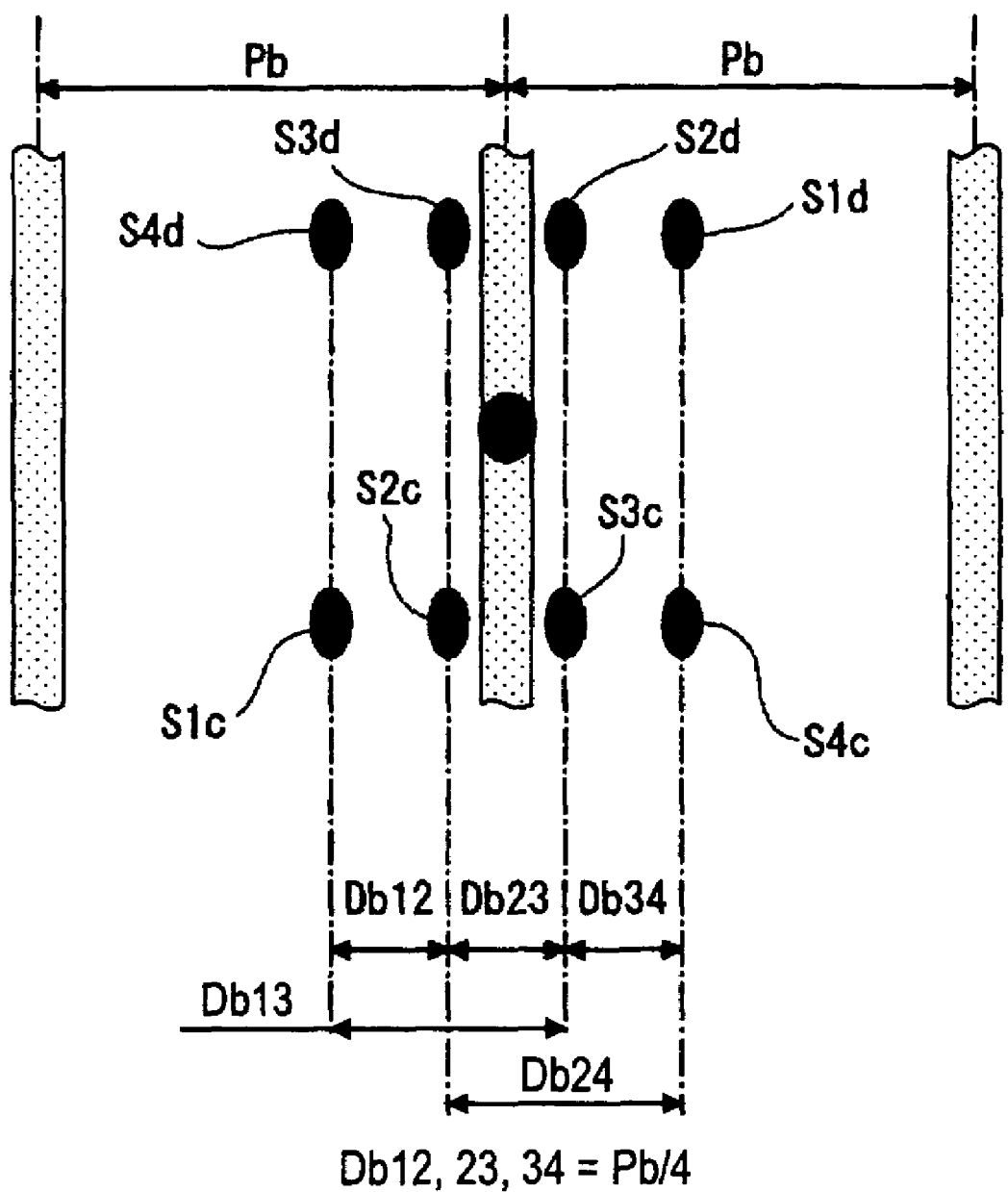
FIG. 7 is a schematic diagram showing the positional relationship between the spots of the laser light corresponding to CD and the tracks when distances between sub-spots of the laser light corresponding to CD are set to a quarter of a track pitch.

When, for example, $n_{13}$, $n_{24}$, $n_{12}$, and $n_{34}$ are all 1, $Db_{13}$ and $Db_{24}$ are approximately $Pb/2$, and $Db_{12}$ and $Db_{34}$ are approximately $Pa/4$. Accordingly, distances Db between the adjacent spots are all approximately $Pa/4$ (see FIG. 7).

Therefore, since the standard track pitch Pb of the CD 100b is about 1.6 μm, when $n_{13}$, $n_{24}$, $n_{12}$, $n_{34}$ are all 1, the distances $Db_{12}$, $Db_{23}$, and $Db_{34}$ are all about 0.4 μm.

Accordingly, when an tracking error signal is detected on the basis of the main beam and the sub-beams received by the photodetector 17, the distances $Db_{13}$ and $Db_{24}$ are about one-half of the track pitch Pb. Therefore, phases of tracking error signals detected by sub-spots $S_{1c}$ and $S_{3c}$, phases of tracking error signals detected by sub-spots $S_{2c}$ and $S_{4c}$, phases of tracking error signals detected by sub-spots $S_{1d}$ and sub-spots $S_{3d}$, and phases of tracking error signals detected by sub-spots $S_{2d}$ and $S_{4d}$ are inverted from each other. Accordingly, the amplitude of the total tracking error signal obtained by the sub-beams is 0, and only a DC offset signal generated when the objective lens 15 is displaced in the tracking direction is obtained. Although both a tracking error signal and a DC offset signal are detected by the main beam, an adequate tracking error signal can be obtained by cancelling the DC offset signal detected by the main beam with the DC offset signal detected by the sub-beams.

The distances $Db_{13}$, $Db_{24}$, $Db_{12}$, and $Db_{34}$ between the sub-spots of the sub-beams are exclusively determined from the design of the diffracting element 10. Therefore, even when the phase of the tracking error signal detected by the main beam and the phases of the tracking error signals detected by the sub-beams vary due to the eccentricity of the CD 100b, the amplitude of the DPP signal is prevented from being reduced due to the eccentricity of the CD 100b since the tracking error signals of the sub-beams cancel each other.

Figure 8:
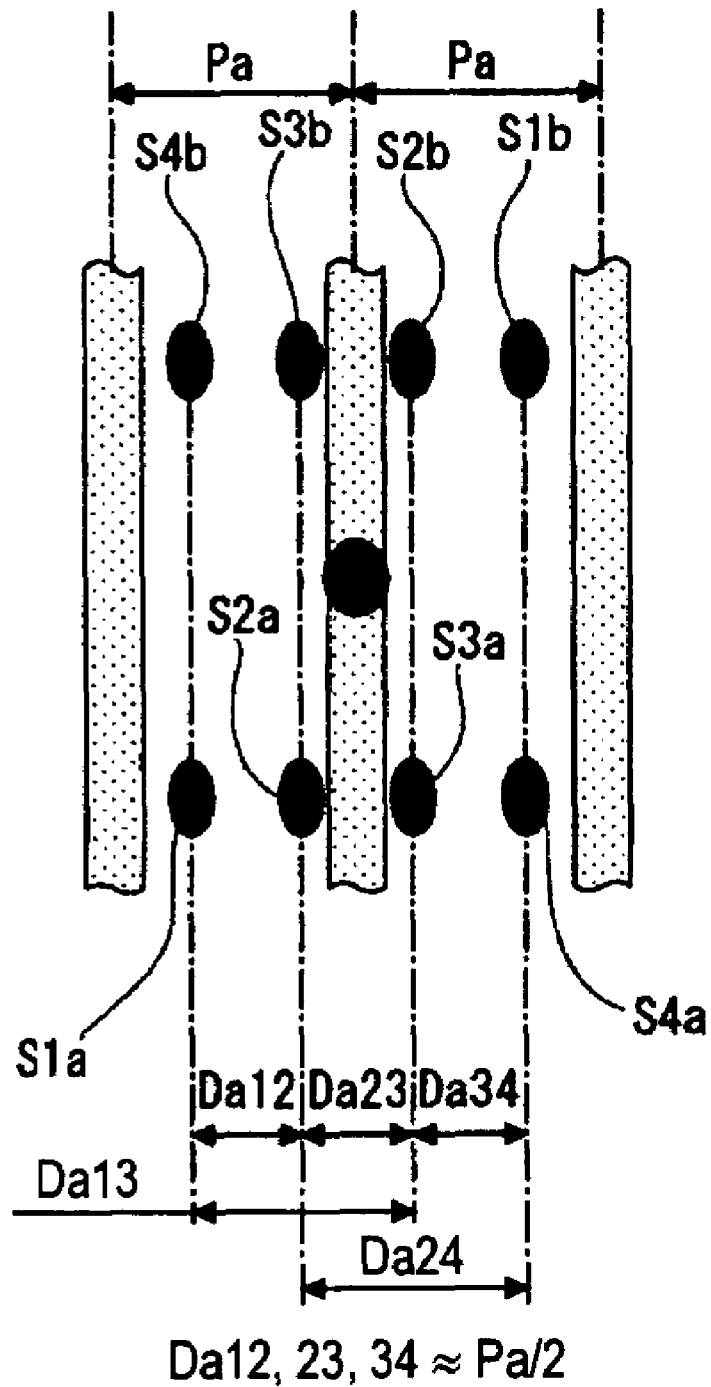
FIG. 8 is a schematic diagram showing the positional relationship between the spots of the laser light corresponding to DVD and the tracks when the distances between the sub-spots of the laser light corresponding to CD are set to a quarter of the track pitch.

With respect to the DVD 100a, the distance Da is calculated as 0.33 μm from $Da=(650/780)\times Db$. When the DVD 100a is a DVD-ROM, a DVD±R, or a DVD-RW, the standard track pitch Pa is 0.74 μm, and therefore the distance Da is about one-half of the track pitch Pa (see FIG. 8). When the DVD 100a is a DVD-RAM, the standard track pitch Pa is 1.23 μm, and therefore the distance Da is about a quarter of the track pitch Pa.

Accordingly, when the DVD 100a is a DVD-ROM, a DVD±R, or a DVD-RW, phases of tracking error signals detected by sub-spots $S_{1a}$ and $S_{2a}$, phases of tracking error signals detected by sub-spots $S_{3a}$ and $S_{4a}$, phases of tracking error signals detected by sub-spots $S_{1b}$ and sub-spots $S_{2b}$, and phases of tracking error signals detected by sub-spots $S_{3b}$ and $S_{4b}$ are inverted from each other. Accordingly, the amplitude of the total tracking error signal obtained by the sub-beams is close to 0. Although both a tracking error signal and a DC offset signal are detected by the main beam, an adequate tracking error signal can be obtained by cancelling the DC offset signal detected by the main beam with the DC offset signal detected by the sub-beams.

In addition, when the DVD 100a is a DVD-RAM, phases of tracking error signals detected by sub-spots $S_{1a}$ and $S_{3a}$, phases of tracking error signals detected by sub-spots $S_{2a}$ and $S_{4a}$, phases of tracking error signals detected by sub-spots $S_{1b}$ and sub-spots $S_{3b}$, and phases of tracking error signals detected by sub-spots $S_{2b}$ and $S_{4b}$ are inverted from each other. Accordingly, the amplitude of the total tracking error signal obtained by the sub-beams is close to 0. Although both a tracking error signal and a DC offset signal are detected by the main beam, an adequate tracking error signal can be obtained by cancelling the DC offset signal detected by the main beam with the DC offset signal detected by the sub-beams.

As described above, when the information signals are recorded on or reproduced from the disc-shaped recording medium 100, the optical pickup 6 provides a reliable tracking error signal which corresponds to the disc-shaped recording medium 100 and in which the influence of the eccentricity of the disc-shaped recording medium 100 and the rotational displacement of the diffracting element 10 is eliminated or reduced without performing phase adjustment of the diffracting element 10.

In addition, when the information signals are recorded on or reproduced from a plurality of kinds of disc-shaped recording media 100, the diffracting element 10 can be used in common. Therefore, the quality of the tracking error signal can be increased without increasing the number of components and costs.

In addition, all of DVD-ROM, DVD±R, DVD-RW, and DVD-RAM can be used, and therefore the quality of the tracking error signal can be increased irrespective of the kind of DVD.

Although the case in which n is 1, where n is a natural number, is described above, the range of the natural number n is arbitrary.

In addition, it is not necessary to perform phase adjustment of the diffracting element 10 for two kinds of disc-shaped recording media 100. Therefore, tracking error signals corresponding to disc-shaped recording media 100 with different standards, for example, DVDs, CDs, and blue-ray discs can be obtained.

Figure 9:
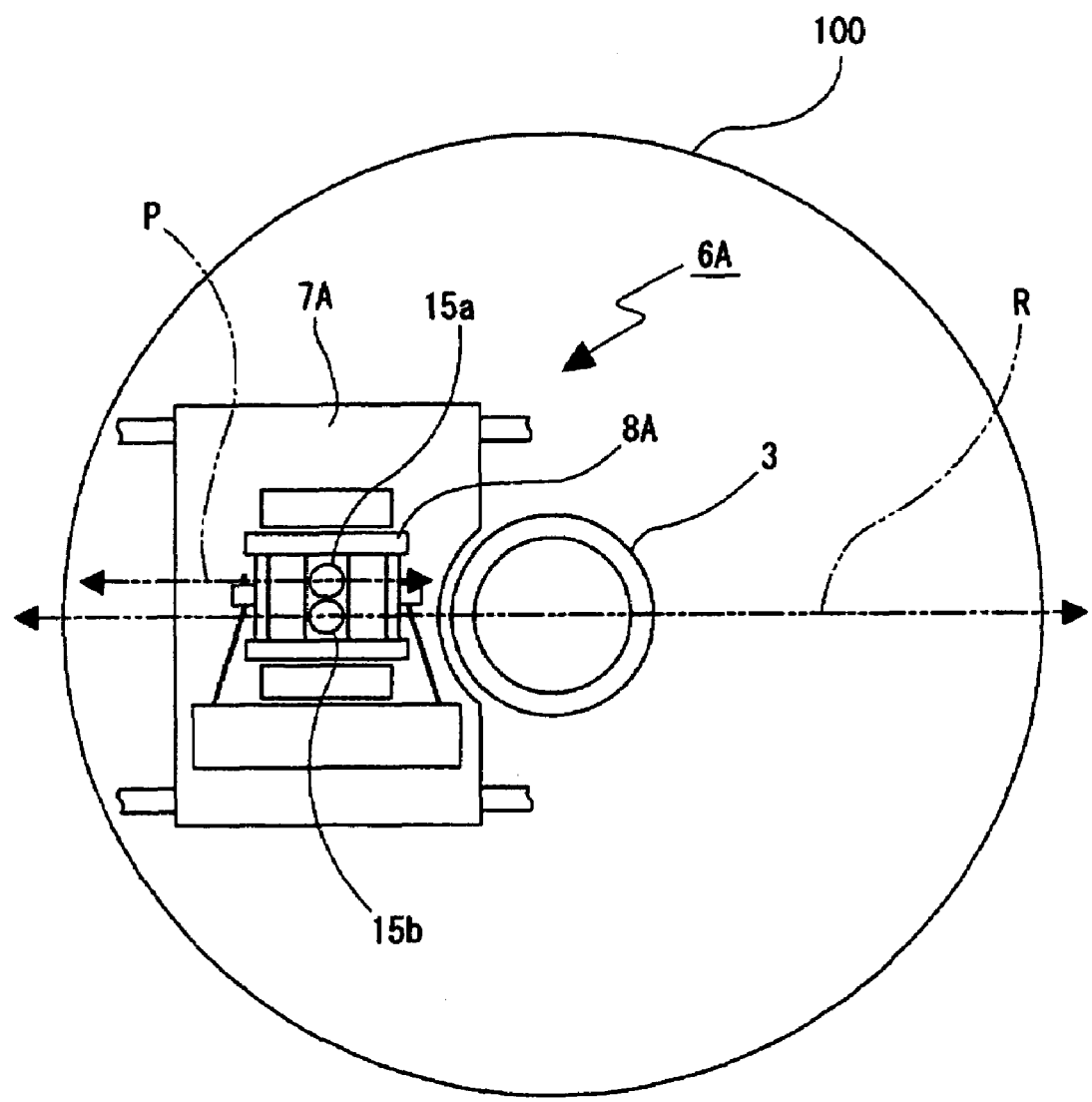
FIG. 9 is a schematic plan view showing the structure of an optical pickup for three kinds of disc-shaped recording media with different standards.

An example of an optical pickup that can record or reproduce information signals on three kinds of disc-shaped recording media 100 having different standards will be described below with reference to FIG. 9.

An optical pickup 6A records or reproduces information signals on, for example, a DVD, a CD, and a blue-ray disc. The optical pickup 6A includes a moving base 7A and an objective-lens driver 8A disposed on the moving base 7A. The objective-lens driver 8A includes a first objective lens 15a and a second objective lens 15b.

The optical pickup 6A includes a first optical system similar to that shown in FIG. 2 that has a common optical path for the DVD and the CD and a second optical system that has another optical path for the blue-ray disc.

The first objective lens 15a is disposed on the optical path of the first optical system and has a function of focusing the laser light onto a recording surface of a DVD 100a or a CD 100b. The second objective lens 15b is disposed on the optical path of the second optical system, and has a function of focusing the laser light onto a recording surface of a blue-ray disc.

Figure 10:
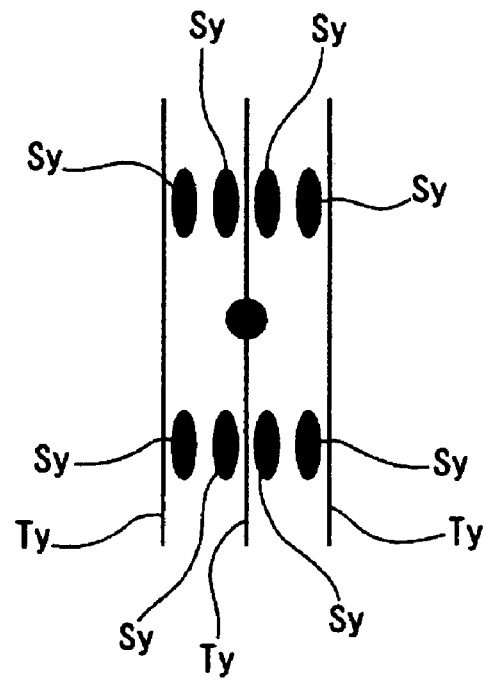
FIG. 10 is a schematic diagram showing the state of sub-spots of laser light radiated through a second objective lens that moves along a radius in the optical pickup shown in FIG. 9.
Figure 11:
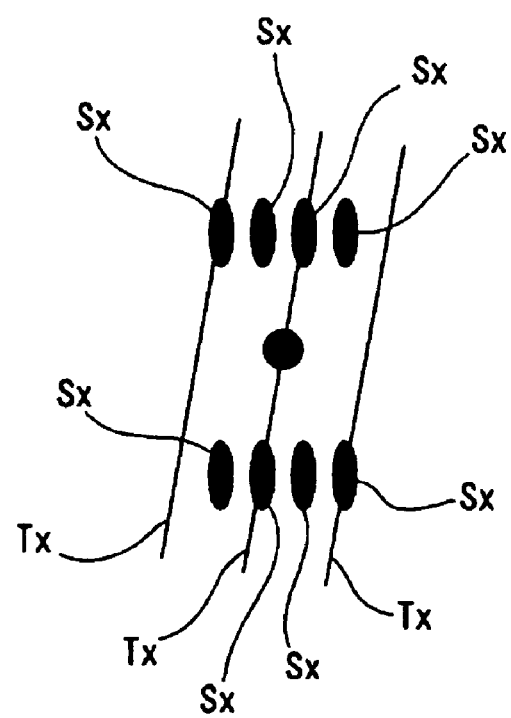
FIG. 11 is a schematic diagram showing the state of sub-spots of laser light radiated through a first objective lens that moves along a line parallel to the radius in the optical pickup shown in FIG. 9.

When the optical pickup 6A moves along the radius R of the disc-shaped recording medium 100, the second objective lens 15b also moves along the radius R of the disc-shaped recording medium 100. However, the first objective lens 15a moves along a line P parallel to the radius R of the disc-shaped recording medium 100. The laser light directed onto the disc-shaped recording medium (blue-ray disc) through the second objective lens 15b forms sub-spots Sy evenly arranged parallel to the tracks Ty of the disc-shaped recording medium, as shown in FIG. 10. However, as shown in FIG. 11, the laser light directed onto the disc-shaped recording medium (the DVD 100a or the CD 100b) through the first objective lens 15a forms sub-spots Sx unevenly arranged at an angle with respect to the tracks Tx of the disc-shaped recording medium. In particular, when the optical pickup 6A is near an inner periphery of the disc-shaped recording medium, the inclination is large since the curvature of the recording tracks is large.

However, in the disc drive apparatus 1, since the laser light is divided into four pairs of sub-beams and the distances between the sub-beams are set to satisfy predetermined conditional equations, the optical pickup 6A is not influenced by the phase rotation caused because of the first objective lens 15a that does not move along the radius R. This structure is particularly suitable for optical pickups having optical systems for three kinds of disc-shaped recording media using different wavelengths.

Next, a modification of the diffracting element will be described below with reference to FIG. 12.

Figure 12:
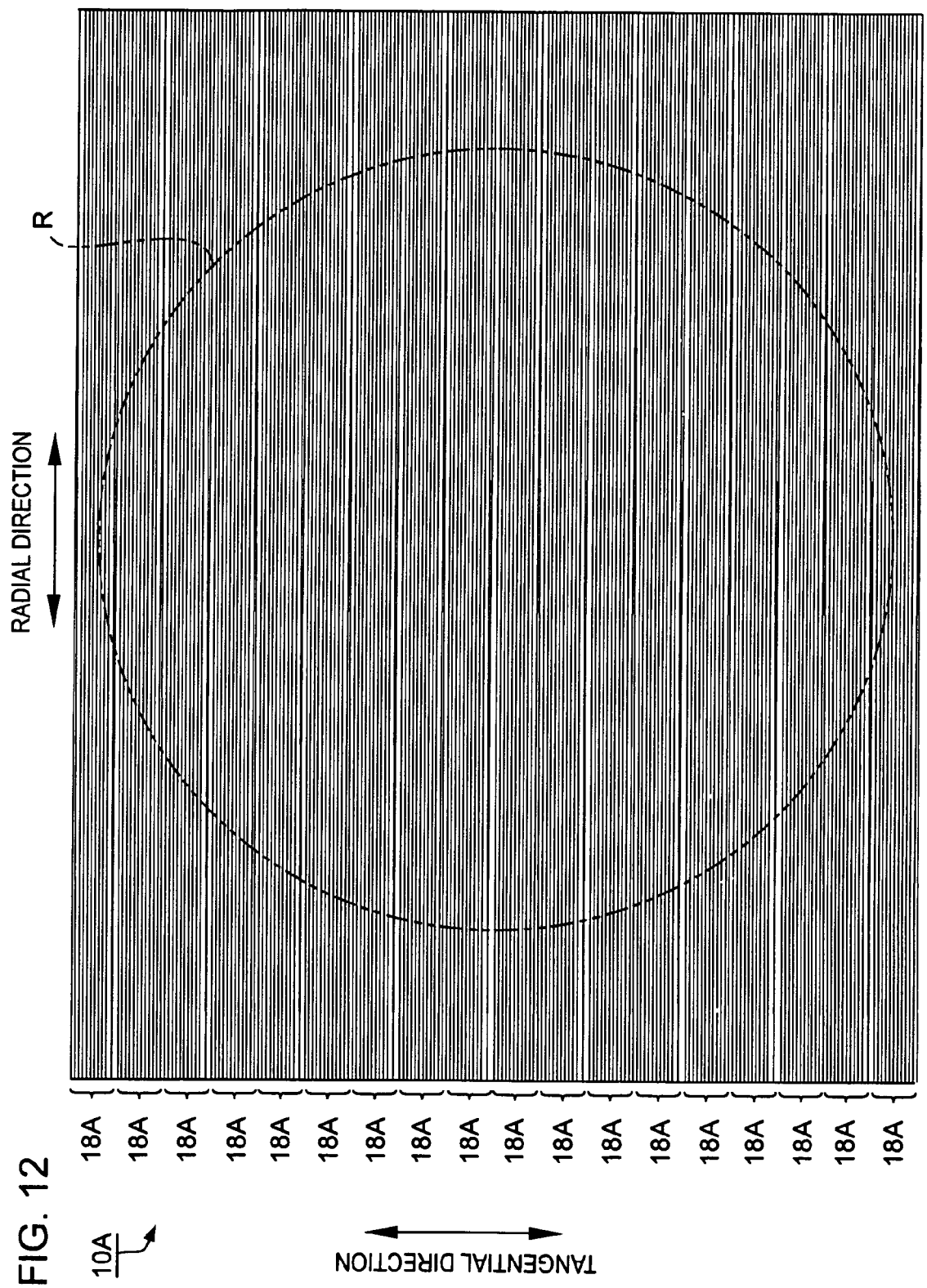
FIG. 12 is a schematic diagram showing a modification of the diffracting element.
Figure 13:
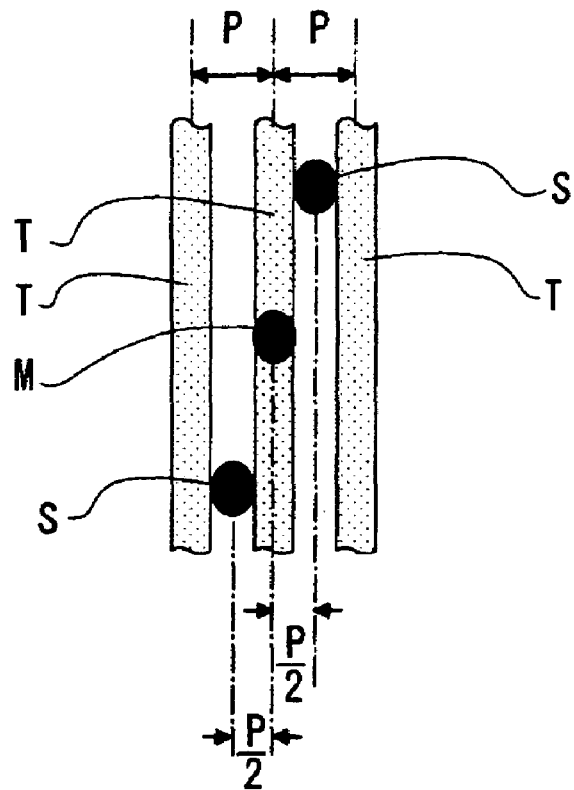
FIG. 13 is a schematic diagram showing the state of spots of laser light obtained by a known optical pickup using a differential push-pull method.
Figure 14:
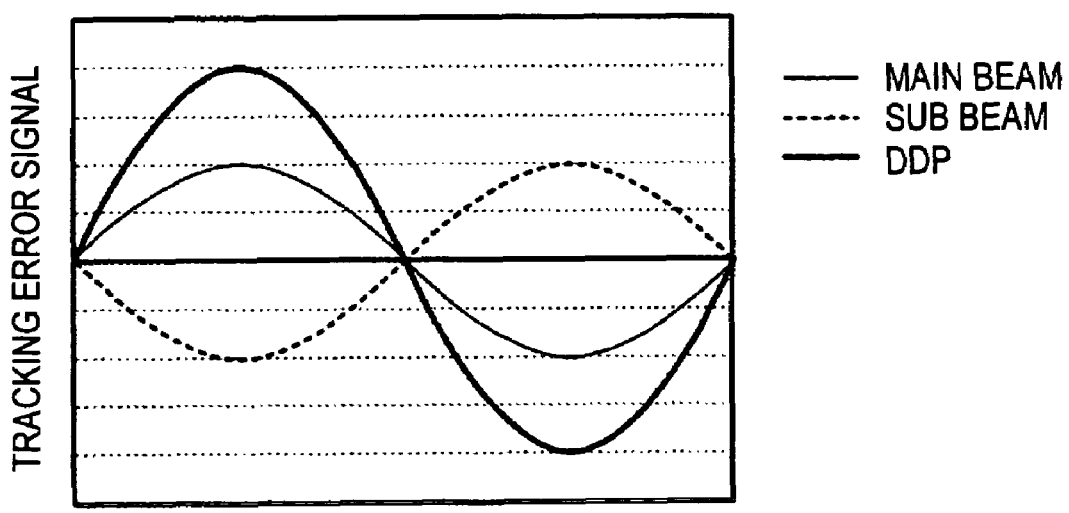
FIG. 14 is a graph showing a tracking error signal obtained by the known optical pickup using the differential push-pull method.
Figure 15:
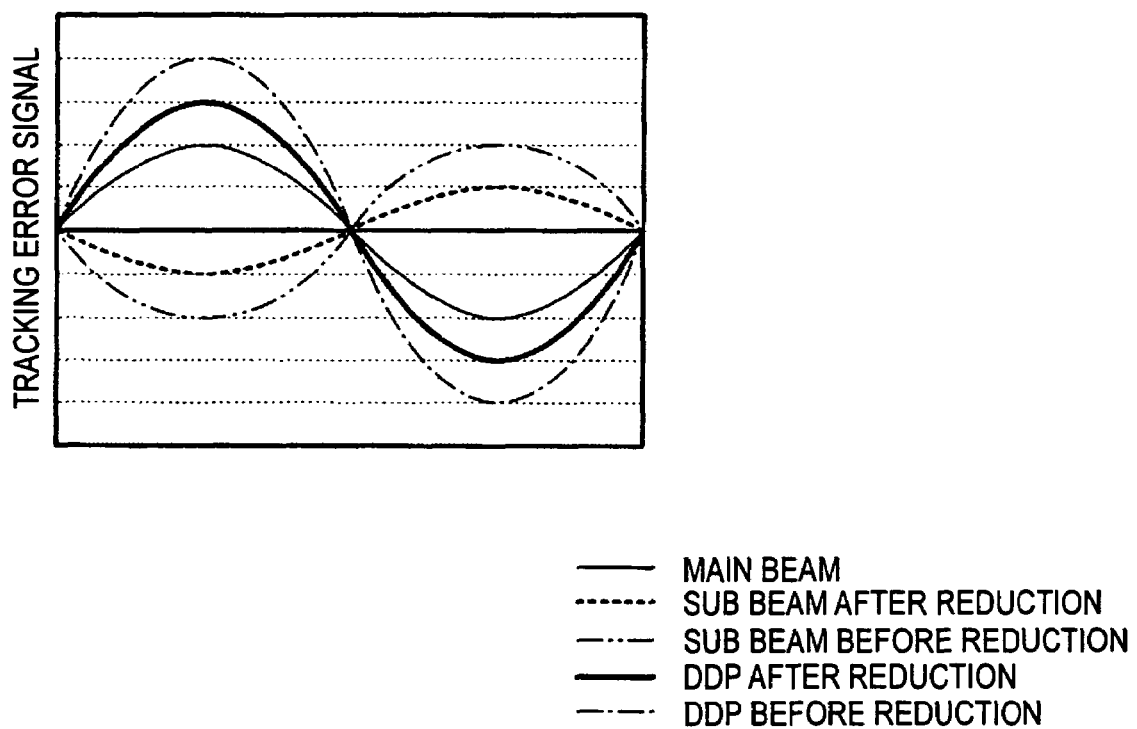
FIG. 15 is a graph showing the problem of the known optical pickup.

A diffracting element 10A shown in FIG. 12 has a plurality of regions 18A, and the arrangement direction of the regions 18A is the same as the tangential direction of the disc-shaped recording medium 100.

The number of regions into which the diffracting element 10A is divided is larger than the number of regions into which the diffracting element 10 is divided.

In optical pickups, a light-emitting element and an objective lens are generally not near each other, but are positioned away from each other. Therefore, the sub-beams directed onto the recording surface of the disc-shaped recording medium may have different intensities due to the influence of the position and angle of incidence of the laser light from the light-emitting element with respect to an opening of the objective lens, diffraction, etc. For example, when one of a pair of sub-beams entirely enters the opening of the objective lens while the other one of the pair only partially enters the opening of the objective lens, the two sub-spots directed onto the recording surface of the disc-shaped recording medium have different intensities.

However, when the number of regions is increased as in the diffracting element 10A, the laser light R enters multiple regions 18A of the diffracting element 10A. Accordingly, the total area of the regions 18A which form the first sub-beams, the total area of the regions 18A which form the second sub-beams, the total area of the regions 18A which form the third sub-beams, and the total area of the regions 18A which form the fourth sub-beams are easily set to the same area. Therefore, the intensities of the sub-beams forming the sub-spots S1, S2, S3, and S4 separately from each other in substantially radial direction of the disc-shaped recording medium 100 are substantially equal. As a result, the tracking error signals detected by the sub-beams reliably cancel each other, and the reliability of the tracking control operation is increased.

In addition, in the tracking control operation, the objective lens 15 moves in a substantially radial direction of the disc-shaped recording medium 100. At this time, when the regions 18A are arranged in the tangential direction as in the diffracting element 10A, the positional relationship between the laser light R and the regions 18A does not vary, and generation of the sub-beams is prevented from being influenced.

In addition, the push-pull signal varies in substantially radial direction of the disc-shaped recording medium 100. Therefore, when the regions 18A are arranged in the tangential direction as described above, the relationship between the main beam and the laser light before diffraction does not vary, and the modulation is prevented from being influenced.

The shape and structure of each component in the above-described embodiment are simply an example for carrying out the present invention, and the technical scope of the present invention is not limited to the above-described embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup for recording or reproducing information signals on a plurality of kinds of disc-shaped recording media, the optical pickup moving in a radial direction of a disc-shaped recording medium mounted on a disc table while irradiating the disc-shaped recording medium with laser light emitted from a light-emitting element and having a wavelength corresponding to the kind of the disc-shaped recording medium, the optical pickup comprising:

a diffracting element having a plurality of regions for dividing the laser light emitted from the light-emitting element into a main beam, a pair of first sub-beams, a pair of second sub-beams, a pair of third sub-beams, and a pair of fourth sub-beams, wherein, when the first, second, third, and fourth sub-beams form first, second, third, and fourth sub-spots, respectively, on a recording surface of a disc-shaped recording medium which does not have the largest track pitch among said plurality of kinds of disc-shaped recording media, said first, second, third, and fourth sub-spots being arranged in that order along a radial direction of said disc-shaped recording medium, and when a distance from the centers of the first sub-spots to the centers of the second sub-spots is $Da_{12}$, a distance from the centers of the third sub-spots to the centers of the fourth sub-spots is $Da_{34}$, a distance from the centers of the first sub-spots to the centers of the third sub-spots is $Da_{13}$, a distance from the centers of the second sub-spots to the centers of the fourth sub-spots is $Da_{24}$, $n_{12}$, $n_{34}$, $n_{13}$, and $n_{24}$ are natural numbers, and the track pitch of said disc-shaped recording medium is Pa, the distance $Da_{12}$ is approximately $(2n_{12}-1) \times Pa/2$, the distance $Da_{34}$ is approximately $(2n_{34}-1) \times Pa/2$, the distance $Da_{13}$ is approximately $(2n_{13}-1) \times Pa$, and the distance $Da_{24}$ is approximately $(2n_{24}-1) \times Pa$, and phases of a plurality of tracking error signals detected by said first, second, third, and fourth sub-spots are inverted from each other and an amplitude of a total tracking error signal obtained by the pairs of sub-beams is zero.

2. The optical pickup according to claim 1, wherein the regions of the diffracting element are arranged along a tangential direction of the disc-shaped recording medium.

3. An optical pickup for recording or reproducing information signals on a plurality of kinds of disc-shaped recording media, the optical pickup moving in a radial direction of a disc-shaped recording medium mounted on a disc table while irradiating the disc-shaped recording medium with laser light emitted from a light-emitting element and having a wavelength corresponding to the kind of the disc-shaped recording medium, the optical pickup comprising:

a diffracting element having a plurality of regions for dividing the laser light emitted from the light-emitting element into a main beam, a pair of first sub-beams, a pair of second sub-beams, a pair of third sub-beams, and a pair of fourth sub-beams, wherein, when the first, second, third, and fourth sub-beams form first, second, third, and fourth sub-spots, respectively, on a recording surface of a disc-shaped recording medium which does not have the smallest track pitch among said plurality of kinds of disc-shaped recording media, said first, second, third, and fourth sub-spots being arranged in that order along a radial direction of said disc-shaped recording medium, and when a distance from the centers of the first sub-spots to the centers of the second sub-spots is $Db_{12}$, a distance from the centers of the third sub-spots to the centers of the fourth sub-spots is $Db_{34}$, a distance from the centers of the first sub-spots to the centers of the third sub-spots is $Db_{13}$, a distance from the centers of the second sub-spots to the centers of the fourth sub-spots is $Db_{24}$, $n_{12}$, $n_{34}$, $n_{13}$, and $n_{24}$ are natural numbers, and the track pitch of said arbitrary kind of disc-shaped recording medium is Pb, the distance $Db_{13}$ is approximately $(2n_{13}-1) \times Pb/2$, the distance $Db_{24}$ is approximately $(2n_{24}-1) \times Pb/2$, the distance $Db_{12}$ is approximately $(2n_{12}-1) \times Pb/4$, and the distance $Db_{34}$ is approximately $(2n_{34}-1) \times Pb/4$, and phases of a plurality of tracking error signals detected by said first, second, third, and fourth sub-spots are inverted from each other and an amplitude of a total tracking error signal obtained by the pairs of sub-beams is zero.

4. The optical pickup according to claim 3, wherein the regions of the diffracting element are arranged along a tangential direction of the disc-shaped recording medium.

5. The optical pickup according to claim 1, wherein the rotational displacement of the diffracting element is eliminated without performing phase adjustment of the diffracting element.

6. The optical pickup according to claim 1, wherein the distances between the centers of sub-spots with respect to the centers of other sub-spots is such that phases of tracking error signals detected by the first, second, third, and fourth sub-beams are inverted, such that the tracking error signals cancel each other out.

7. The optical pickup according to claim 3, wherein the rotational displacement of the diffracting element is eliminated without performing phase adjustment of the diffracting element.

8. The optical pickup according to claim 3, wherein the distances between the centers of sub-spots with respect to the centers of other sub-spots is such that phases of tracking error signals detected by the first, second, third, and fourth sub-beams are inverted, such that the tracking error signals cancel each other out.

* * * * *